INVENTOR.
Alexander Ferko

INVENTOR.
Alexander Ferko

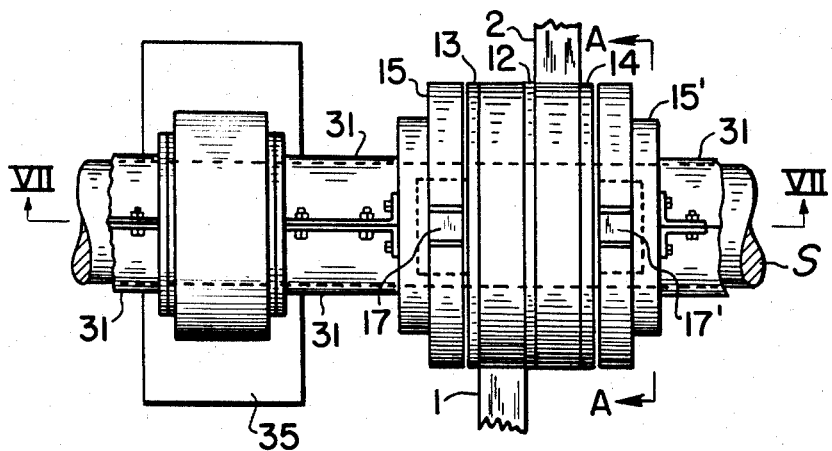
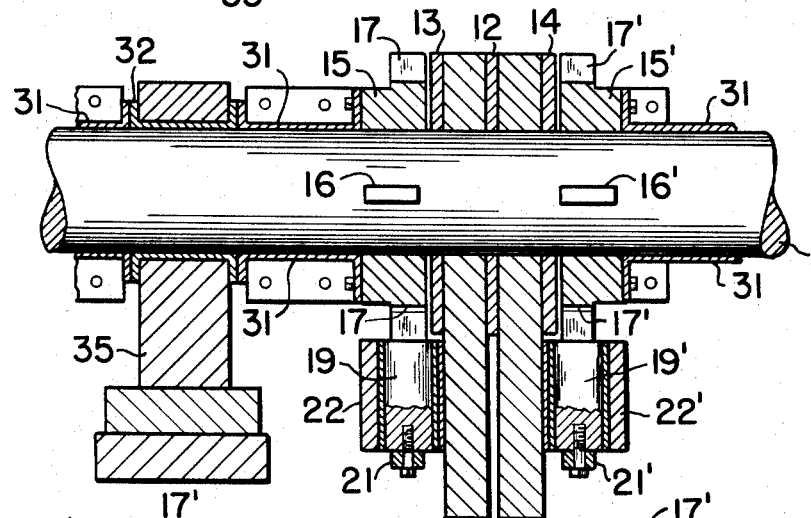
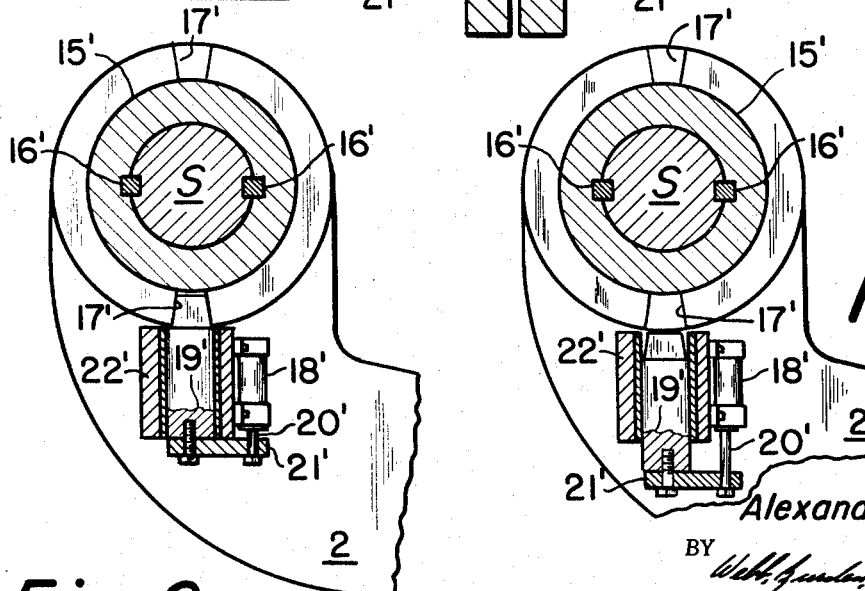
INVENTOR.
Alexander Ferko
BY
HIS ATTORNEYS

United States Patent Office 3,386,598
Patented June 4, 1968

3,386,598
TURNOVER DEVICE
Alexander Ferko, East Palestine, Ohio, assignor to L. W. Nash Company, East Palestine, Ohio, a corporation of Ohio
Filed Oct. 25, 1966, Ser. No. 589,318
10 Claims. (Cl. 214—1)

ABSTRACT OF THE DISCLOSURE

This invention relates to a device for inverting material and more particularly to a fully opened device for turning packs of sheets and other elements such as plates and slabs so that the upper side of the pack or other element is rotated through 180° and becomes the bottom.

In the production of sheets and other elements, it is often necessary to finish both sides or to have the finished side facing downwardly for subsequent shipping or fabrication for inspection of the opposite side. While it is possible to individually manually invert separate sheets and other elements, such is slow and uneconomical; and for this reason, it is desirable to mechanically invert a pack so that the opposite surface faces upwardly. Sheet material is generally of very light gauge; and it is, therefore, necessary that the pack be rigidly supported during inversion. Additionally, it is important that relative movement of individual members in a pack be prevented during inversion since relative movement damages the surfaces of the members. Since a pack of sheets or other material is of considerable weight, it is necessary that the turnover device have considerable strength; and it is important that access be provided to the device to permit loading and unloading. In the past, C-shaped devices have been used for inverting material; but these devices have disadvantages such as difficulty in loading and unloading and load size limitations.

My invention provides a novel turnover device which is of sufficient strength to invert a heavy pack or other element and which is capable of firmly holding the material to permit inversion without relative movement of the members in a pack. Additionally, my turnover device provides support throughout substantially the full surface of the pack; and, therefore, bending or warping during inversion is prevented. The turnover device which forms the subject of my invention is advantageous in that the jaws may be opened 180° for ready access to either jaw for loading and unloading. The 180° opening of the jaws of my device also permits loading material onto one jaw while material which has been inverted rests on the other jaw. This arrangement permits rapid inversion of a large volume of material without requiring specially designed access equipment to load and unload the device.

Figure 1:
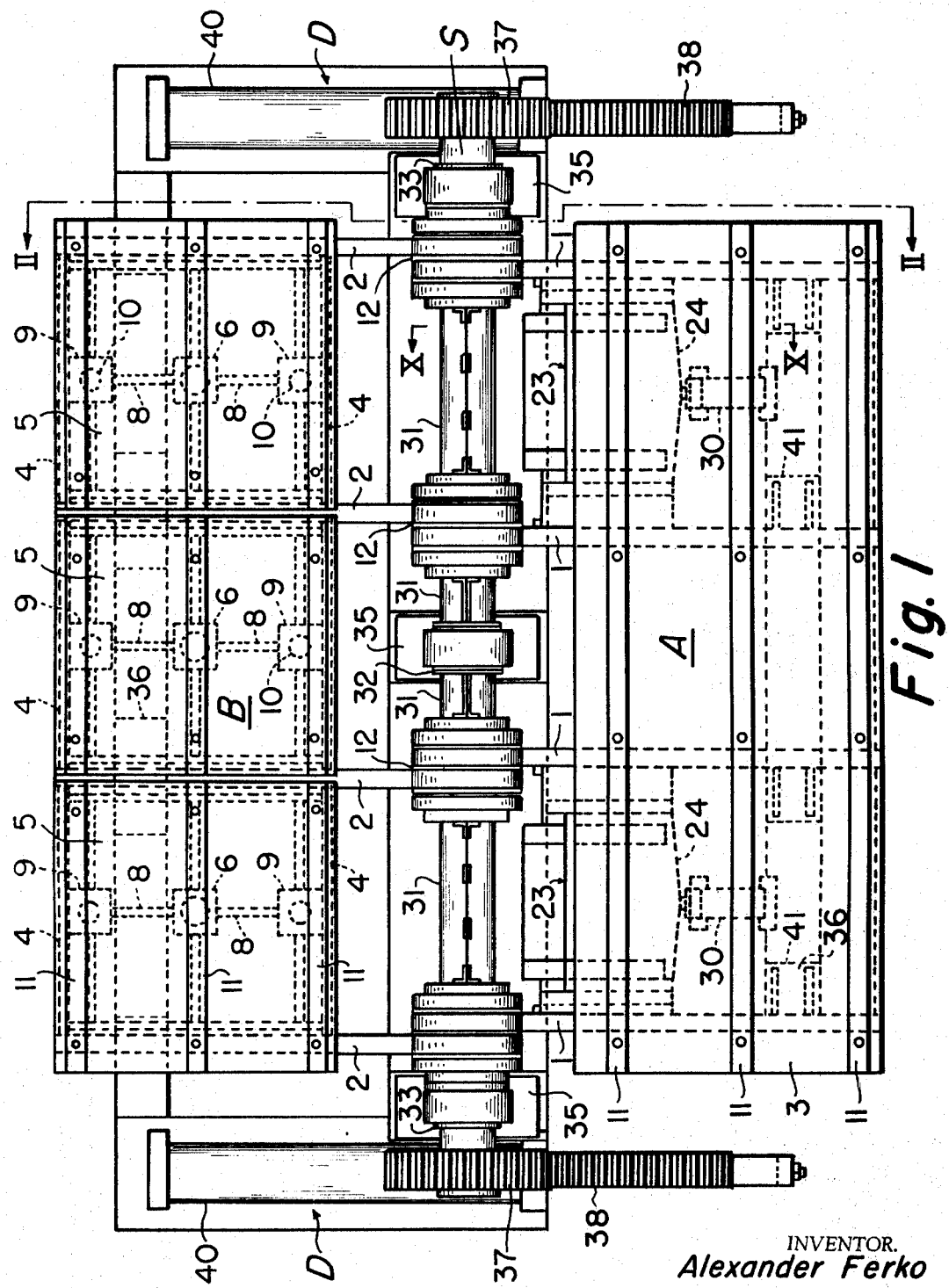
Figure 2:
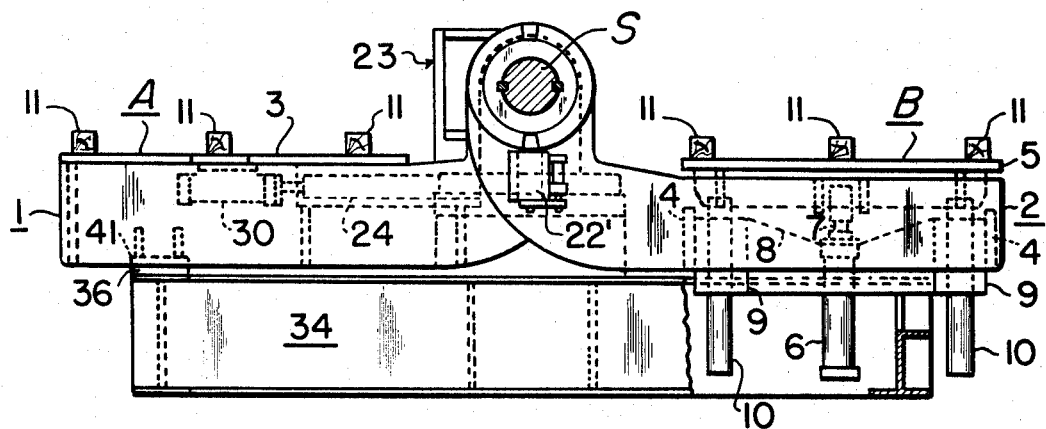
Figure 3:
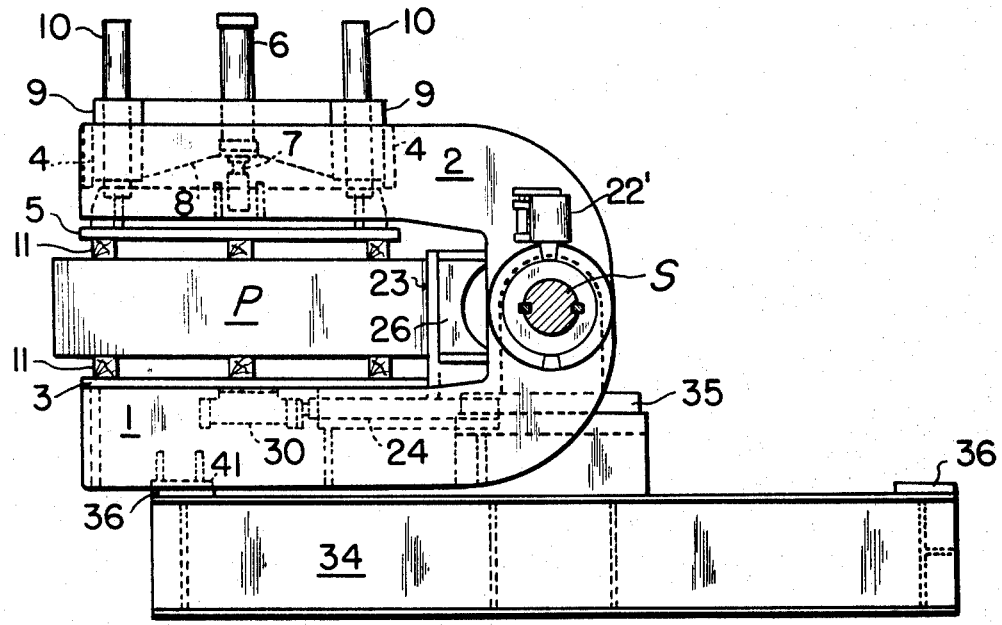
Figure 4:
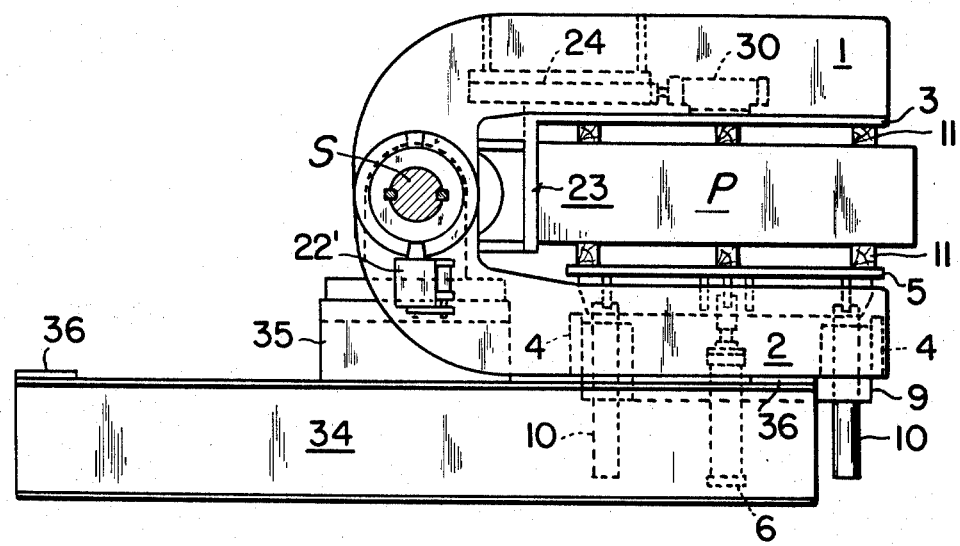
Figure 5:
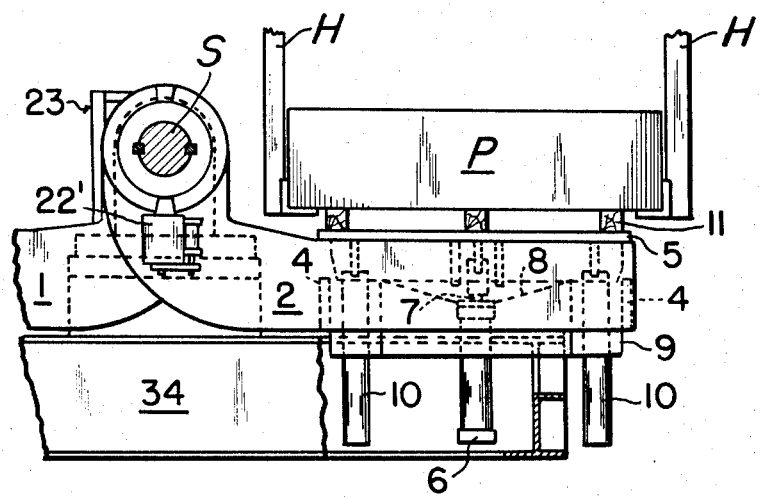

In the accompanying drawings I have shown a preferred embodiment of my invention in which:

FIG. 1 is a plan view of my turnover device with the jaws open;
FIG. 2 is a section on line II—II of FIG. 1;
FIG. 3 is an elevation of the turnover device with a pack of material clamped in position prior to inversion;
FIG. 4 is an elevation of the turnover device with a pack of material in the inverted position;
FIG. 5 is an elevation showing a crane in lifting engagement with a pack;
FIG. 6 is an enlarged plan of the main shaft and the mounting arrangement for the arms;
FIG. 7 is a vertical section on line VII—VII of FIG. 6.
FIG. 8 is a section on line A—A of FIG. 6 showing the arm locked to the main shaft.

Figure 10:
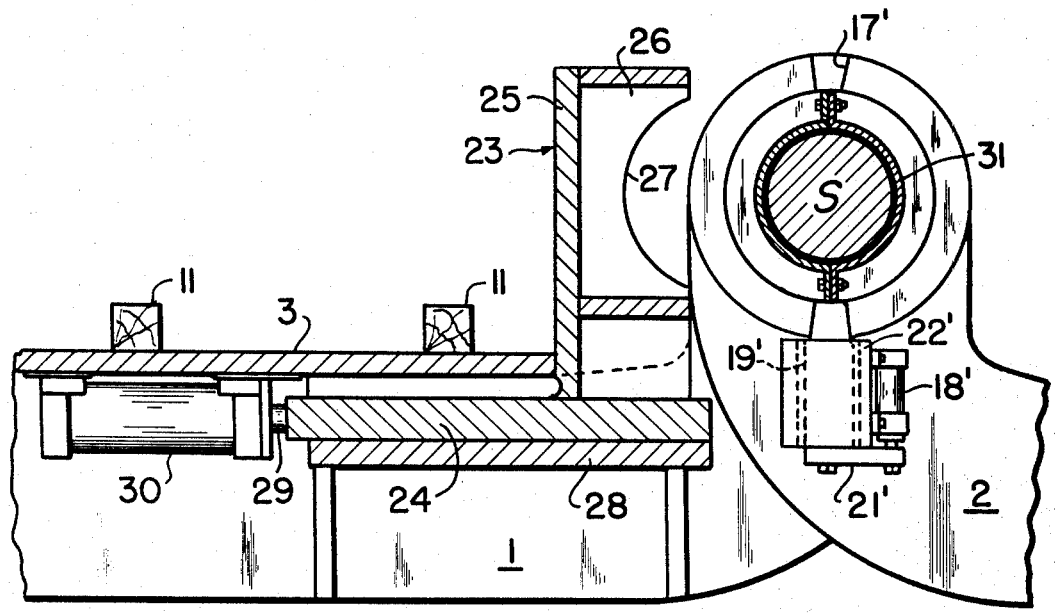
Figure 11:
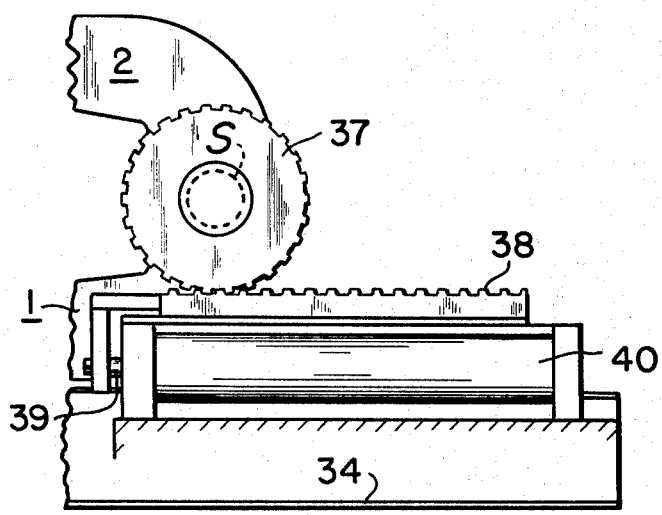

FIG. 9 is a section on line A—A of FIG. 6 showing the locking member disengaged;
FIG. 10 is a partial section on line X—X of FIG. 1; and
FIG. 11 is an elevation showing the drive mechanism for rotating the main shaft.

Referring to FIG. 1, my device consists of a pair of jaws designated generally A and B and a main shaft S which is rotated by drive mechanisms designated generally D. Each jaw includes a plurality of spaced L-shaped arms. The arms for jaw A are designated 1 and the arms for jaw B are designated 2. Although four arms are shown for each jaw in FIG. 1, it should be understood that the number of arms is determined by the length of the material to be inverted and is not a critical part of my invention. A base plate 3 extends over the arms 1 and is attached to the upper edges of the arms to form the unitary jaw A. The arms 2 are connected by longitudinally extending plates 4 which are welded to the vertical faces of adjacent arms to form the base for the unitary jaw B. As is readily apparent, each jaw may be rotated as a unit since the arms are attached.

The jaw B includes a plurality of independent vertically movable clamping platens 5. A platen is supported between each pair of adjacent arms 2, and three platens are shown in FIG. 1. Each platen is mounted on a hydraulic cylinder 6 having a piston rod 7 attached to the lower surface of the platen at the approximate center thereof. The hydraulic cylinders are supported by plates 8 carried by the arms 2 so that the cylinders are movable with the arms. A guide sleeve 9 is welded to each longitudinal plate 4 midway of arms 2, and these sleeves receive guide rods 10 which depend from the lower surfaces of the platens. Each platen is independently vertically adjustable by means of its hydraulic cylinder 6, and rotation of the platens is prevented by guide rods 10 riding in guide sleeves 9. As shown in FIG. 1, each guide sleeve is located between a plate 4 and a plate 8, and the outer end of plate 8 is welded to the guide sleeve. A plurality of plates is welded to the underside of each platen to provide rigidity.

The upper surface of plate 1 and the upper surface of each platen 5 is provided with a plurality of elongated wooden blocks 11 which extend throughout the length of the plate and the individual platens to which they are attached. These blocks space the bottom of the pack from the upper surfaces of the plate and the platens so that grab hooks H of a crane, fingers or slings can be positioned beneath the pack. The blocks may be attached to plate 3 and platens 5 in any convenient way and be formed integral with the plate and the platens without departing from the scope of my invention.

The following description of the mounting and locking arrangements for arms 1 and 2 is made with specific reference to FIGS. 6–9; and although only one pair of arms is described, it should be understood that the mounting and locking arrangements are the same for each pair of arms along shaft S. Similar reference numerals are used to designate similar parts of the mounting and locking arrangements for arms 1 and 2, and a prime is affixed to the numerals designating the mounting and locking arrangements for arm 2. Each arm is L-shaped and is formed with an aperture in its short leg which receives main shaft S. A bushing or appropriate bearings are fitted into the apertures to reduce friction during rotation. The arms are separated along the shaft by washer 12, washers 13 and 14 are located adjacent to the outer surfaces of the arms. Drive disc 15 for arm 1 is located adjacent washer 13 and drive disc 15' for arm 2 is located adjacent washer 14. The drive discs are attached to shaft S by keys 16 which extend into aligned slots in the drive disc and the shaft in the manner shown in FIGS. 8 and 9. Each drive disc is formed with a large diameter portion and a smaller diameter portion, and a pair of drive slots designated 17 and 17' is located in the large diameter portion of each disc. The drive slots in each disc are spaced 180° from each other and are shaped to tightly receive drive dogs for a reason pointed out hereinafter.

Each arm carries a guide designated 22 and 22', and a drive dog designated 19 and 19' is located within each guide for sliding movement relative thereto. The lower end of each dog is attached to a link designated 21 and 21' which is attached to a rod designated 20 and 20' of a hydraulic cylinder designated 18 and 18' which is mounted on the exterior of the corresponding guide. Guide 22' is shown in section in FIGS. 7–9. When the dog is moved in the guide by operation of the hydraulic cylinder, it will fit tightly into a drive slot as shown in FIG. 8. The slots are spaced 180° on the periphery of the discs so that a slot is aligned with a drive dog when arms 1 and 2 are in either the fully closed or the fully opened position.

With specific reference to FIGS. 1 and 10, a pair of adjustable stops 23 are shown cooperating with the base plate 3 of jaw 1. Each stop consists of a horizontal member 24 which lies beneath plate 3 between adjacent arms 1 and a vertical contact member 25 attached to member 24 and extending upwardly at right angles therefrom. Member 25 contacts the inward edge of the material supported on blocks 11 to support the material as it is inverted. A pack P is shown in contact with member 25 in FIG. 3 of the drawings. A support plate 26 is welded to the rear surface of each member 25 and is provided with a semi-circular cut out portion 27 to embrace shaft S when the stop is retracted. The horizontal member 24 of each stop member slides on a base 28, and the end of member 24 is attached to a rod 29 of a hydraulic cylinder 30 which is attached to the lower surface of plate 3. When rod 29 is retracted, member 25 is pulled against the edge of the pack and when the rod is extended, member 25 is moved away from plate 3 into its retracted position with cut out portion 27 embracing shaft S. The stops are retractable so that the grab hooks of a crane or a carrying sling have sufficient clearance to fit between the edge of the pack and contact members 25 when the pack is positioned on blocks 11.

Each pair of arms is spaced along the shaft by means of split separators 31 which are bolted to each other and to the faces of the drive discs 15 and 15'. The separators between the central pairs of arms are shortened and separated to provide space for the central shaft bearing 32. The outer shaft bearings 33 are located outwardly of the outer pairs of arms, and no split separators are required on the shaft ends.

The overall assembly is supported by a main supporting frame 34 which is attached to the floor of the shop. The bearings 32 and 33 are mounted in bearing blocks 35 which are attached to the main frame, and the turnover device is a single unit. A plurality of shock absorber pads 36 are mounted on the upper surface of main frame 34. A shock absorber pad 36 is located at the rest position of each arm so that when the jaws are open, horizontal plates 41 which are attached to the arms rest upon a shock absorber pad rather than directly on the frame. The shock absorber pads may be made of any resilient material so long as they can withstand the compressive force of loaded jaws A and B.

As shown in FIGS. 1 and 11, a drive gear 37 is attached at each end of shaft S. Each drive gear cooperates with a rack 38 which is attached to a piston rod 39 of a hydraulic cylinder 40. When the rods 39 are extended from the cylinders, racks 38 move in respect of the cylinders 40 which are fixed to the floor of the shop or to the main frame and rotate the drive gears 37 to rotate shaft S. Although two drive mechanisms D are shown, it should be understood that only one drive mechanism is necessary for lighter loads; and a turnover device utilizing a single drive mechanism is within the scope of my invention. Additionally, it should be understood that other means may be utilized for rotating the main shaft without departing from my invention since the specific power source and transmission arrangement do not form a part of the invention.

In the normal operation, my pack turnover device is utilized in the manner set forth hereinafter. Assuming that jaws A and B are in the open position as shown in FIG. 2, a pack P is placed on the support members 11 by a crane or other lifting mechanism with the stops 23 in the retracted position. After the crane hooks are withdrawn, the stops are moved to place member 25 in contact with the edge of the pack. Jaw B is then locked to shaft S by driving dogs 19' carried on arms 2 into slots 17' and the shaft and jaw are rotated in a counterclockwise direction until the jaw overlies jaw A in the manner shown in FIG. 3. Hydraulic cylinders 6 are then actuated to lower the clamping platens 5 until the platen blocks 11 firmly contact the upper surface of the pack. The force exerted by the cylinders 6 is controlled to prevent excessive force which could damage the material to be inverted. The dogs 19 carried on arms 1 are then driven into slots 17 by cylinders 18 to lock arms 1 to drive discs 15 which also lock the arms to shaft S. Jaw B is locked to shaft S since arms 2 are still locked to drive discs 15' by means of dogs 19' and slots 17'. Since all of the operating dogs 19 and 19' are driven into a slot 17 and 17' in drive discs 15 and 15', rotation of shaft S by drive gears 37 rotates jaws A and B and turns pack P. The dogs 19 or 19' for each group of arms are operated simultaneously as both groups of operating cylinders 18 and 18' are controlled through a common valve. The operating cylinders 18 and 18' are also connected with limit switches which are also connected with the drive mechanism to prevent rotation of shaft S until all of the dogs are driven into a slot. This control feature prevents accidental destruction of a dog if only one or two dogs are driven completely into a slot in which case the driven dogs might not have sufficient strength to support the load to be inverted.

After the jaws and the pack have been rotated 180°, they will be in the position shown in FIG. 4, and the elements of the pack are inverted. Dogs 19' carried on arms 2 are now withdrawn from slots 17' by cylinders 18' and the stops 23 retracted and shaft S is rotated in the opposite (counterclockwise) direction. Dogs 19 carried on arms 1 are still inserted in slots 17; and upon actuation of drive mechanism D, jaw A rotates with shaft S back into the open position to provide access to the pack resting on the platen blocks 11. Crane grab hooks H or other lifting means are inserted beneath the pack as shown in FIG. 5, and it is lifted from the blocks. The clamping platens 5 may be lowered to the retracted position by cylinders 6 either before or after the pack is removed from the blocks, but must be retracted before another pack is inverted since sufficient clearance for the new pack must be available when the jaw B is rotated into clamping position above jaw A.

Although the above sequence of operation of my device has been described in connection with a pack of sheets, it should be understood that my device may be used for inverting material of various types whenever it is necessary to have the bottom surface facing upwardly.

My invention has a number of important features which include the ability to rapidly invert large heavy packs and other material without relative movement between the individual elements. My turnover device may be loaded and unloaded simultaneously due to its novel construction, and this provides rapid and inexpensive operation. The reason that my turnover device can be loaded and unloaded simultaneously is that the jaws are not attached to one another and can be rotated independently. Also, the use of independently rotatable jaws permits a 180° opening of the jaws, and the material may be loaded and unloaded by means of standard cranes and material handling equipment rather than requiring specially designed and constructed material handling equipment dimensioned to cooperate with the turnover device.

While I have shown and described a preferred embodiment of my invention, it should be understood that it may be otherwise embodied within the scope of the appended claims.

I claim:

1. Apparatus for inverting material including a main shaft, support means rotatably supporting said main shaft, power means connected to said main shaft for rotating said shaft in said support means, a first jaw mounted on said main shaft and adapted to be locked to said shaft for rotation therewith, a second jaw mounted on said main shaft and adapted to be locked to said shaft for rotation therewith, first means for locking said first jaw to said shaft, second means for locking said second jaw to said shaft, and independent actuating means for said first means and said second means for independently actuating said locking means to independently lock said jaws to said shaft, whereby said jaws can be locked to said shaft independently of one another and whereby one jaw may be moved relative to the other into the material receiving position and both jaws may be moved simultaneously with the shaft to invert the material.

2. Apparatus as set forth in claim 1 wherein said first jaw includes a plurality of L-shaped arms mounted on said shaft and extending outwardly therefrom and a plate attached to the upper surfaces of said arms for supporting material to be inverted, and wherein said second jaw includes a plurality of L-shaped arms mounted on said shaft and extending outwardly therefrom and attached by connecting plates, said arms of said second jaw carrying adjustable clamping means movable relative to said arms whereby said clamping means is adapted to contact material on said plate when said second jaw overlies said first jaw to hold the material between said jaws.

3. Apparatus as set forth in claim 2 wherein said adjustable clamping means comprises a plurality of platens and hydraulic cylinders for moving said platens, the lower surface of each platen being connected to the rod of a hydraulic cylinder and said hydraulic cylinder being mounted on a support frame carried by adjacent arms of said second jaw, and means extending between the lower surface of each platen and said connecting members for guiding said platens during movement of said platens by said cylinders.

4. Apparatus as set forth in claim 2 including retractable stop means on said first jaw, said stop means extending perpendicular to said plate and adapted to contact the edge of material supported on said plate.

5. Apparatus as set forth in claim 4 wherein said stop means include a vertical contact member located between said plate and said main shaft, a reciprocal horizontal member located below said plate and attached to said vertical contact member, and a hydraulic cylinder carried on the lower surface of said plate, the rod of said cylinder being connected to said horizontal member whereby operation of said cylinder moves said horizontal member and said vertical contact member relative to said plate.

6. Apparatus as set forth in claim 1 wherein said first jaw includes a plurality of L-shaped arms mounted on said shaft and a support plate attached to said L-shaped arms, and said second jaw includes a plurality of L-shaped arms mounted on said shaft, plates extending between adjacent arms of said second jaw and attached to said arms to rigidly connect said arms, and said first and second means for locking said jaws to said shaft comprise drive discs rigidly connected on said shaft, one of said discs being adjacent each of said arms, each of said drive discs having radial outwardly opening slots formed in its periphery, a guide mounted on each of said arms adjacent one of said drive discs, a reciprocal dog mounted in each of said guides and adapted to be aligned with a slot in the corresponding drive disc and an actuating means mounted on each of said guides to reciprocate the dog in said guide into a slot when said dog and slot are aligned whereby said jaws are locked to said shaft when said dogs are driven into said slots by said actuating means.

7. Apparatus as set forth in claim 6 where a pair of slots are formed in each drive disc, said slots being spaced 180° around the periphery of said disc.

8. Apparatus for inverting material including a main frame, a rotatable shaft, support means for said shaft mounted at the center of said main frame, power means connected to said shaft to rotate said shaft through 180°, a first jaw mounted on said shaft and extending outwardly from one side thereof above a part of said main frame when said first jaw is in the open position, a second jaw mounted on said shaft and extending outwardly from the other side thereof above another part of said main frame when said second jaw is in the open position, first means for releasably locking said first jaw to said shaft for rotation with said shaft, second means for releasably locking said second jaw to said shaft for rotation with said shaft, said first and second means for releasably locking said jaws to said shaft being independent of each other, whereby said jaws may be individually or simultaneously locked to said shaft for rotation through 180° by rotation of said shaft so that said second jaw can be placed over said first jaw when said jaws are in the closed position and both of said jaws can be rotated until said first jaw overlies said second jaw.

9. Apparatus as set forth in claim 8 wherein said second jaw includes clamping means for firmly holding material between said jaws when said jaws are in the closed position.

10. Apparatus as set forth in claim 8 wherein each of said jaws includes a plurality of plates attached at the lower surface, and shock absorber pads attached to said main frame and aligned with said plates when said jaws are in the open position, whereby said plates rest on shock absorber pads to support said jaws on said main frame.

References Cited

FOREIGN PATENTS 951,740   3/1964   Great Britain.

GERALD M. FORLENZA, *Primary Examiner.*

F. E. WERNER, *Assistant Examiner.*